UNITED STATES PATENT OFFICE

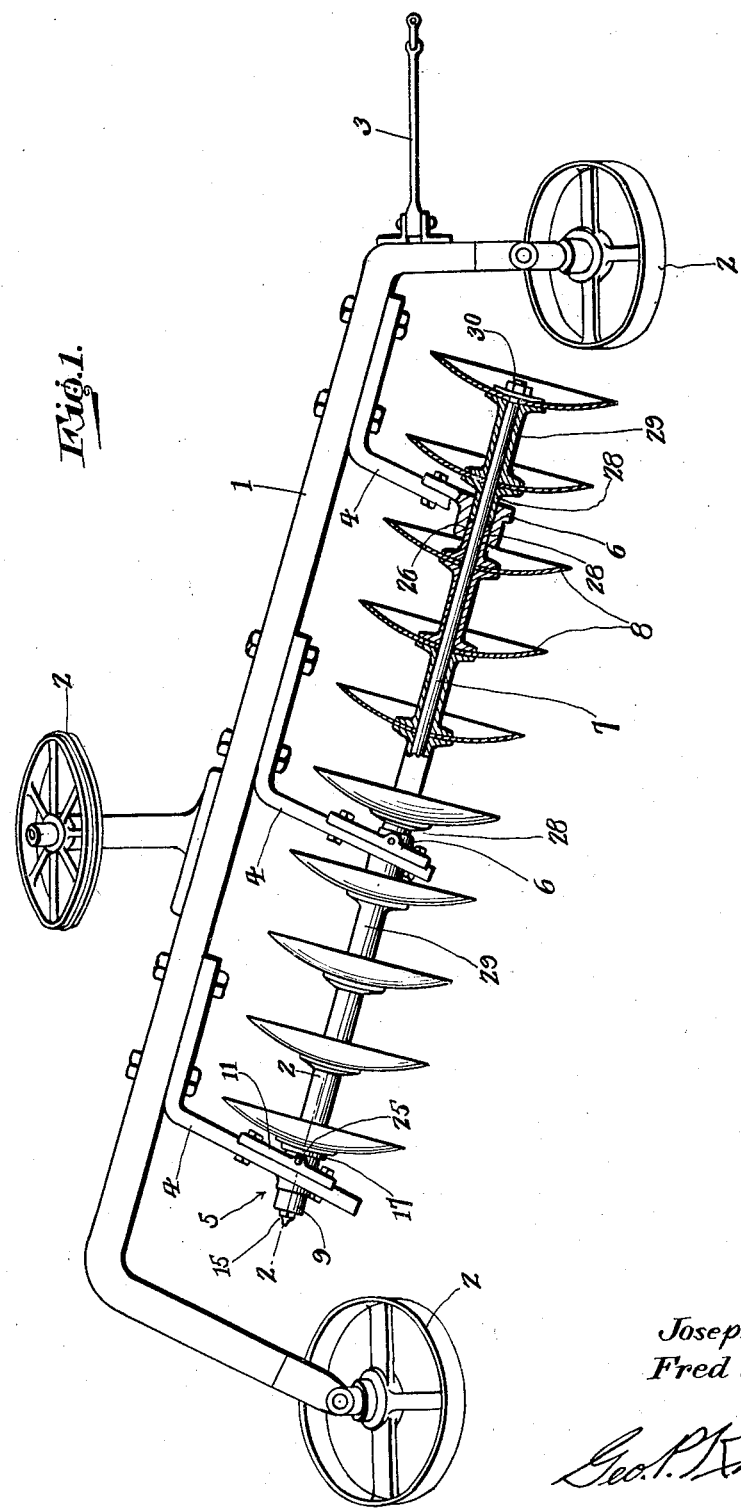

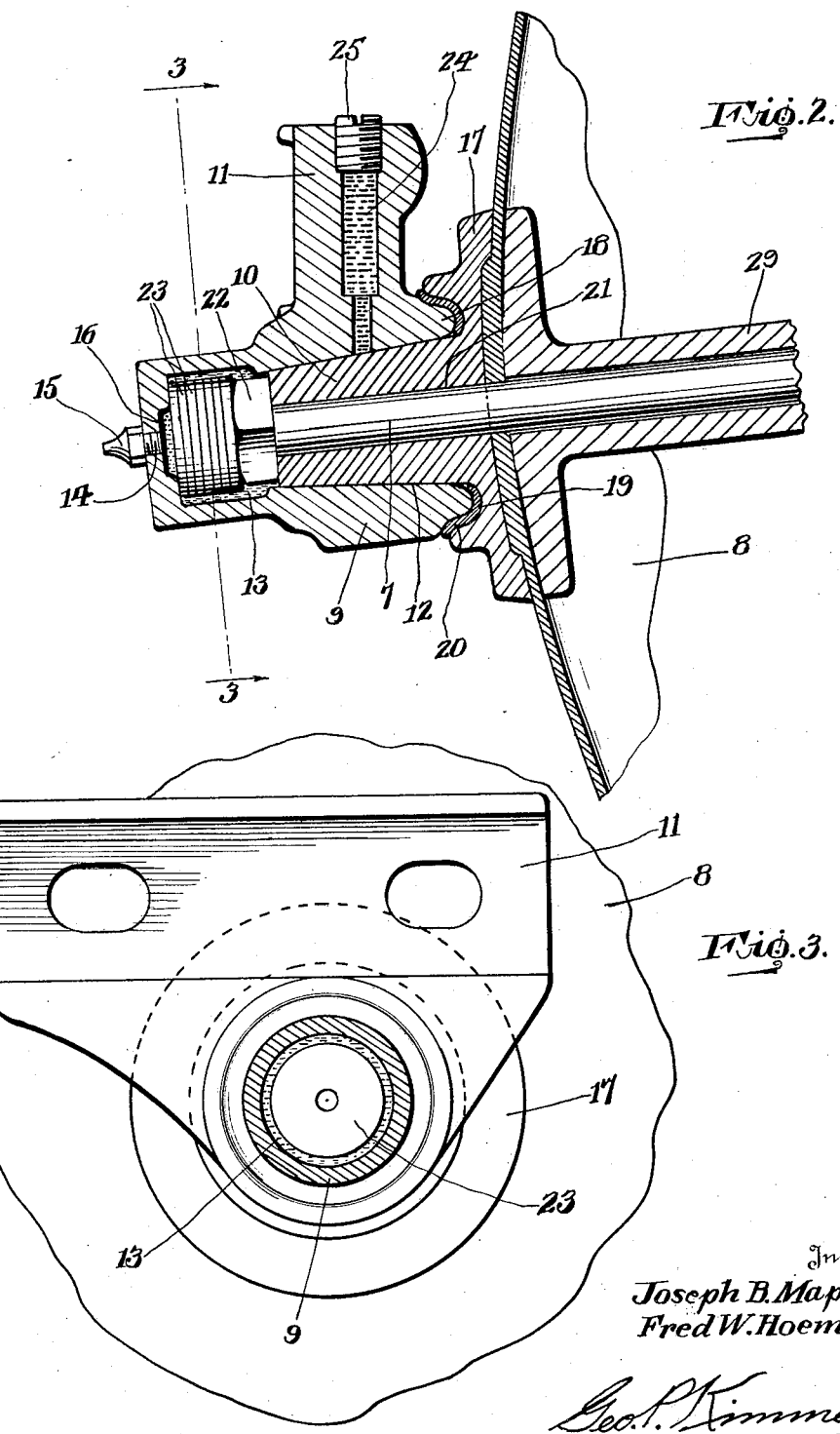

JOSEPH B. MAPP, OF TYRONE, AND FRED W. HOEME, OF HOOKER, OKLAHOMA

SUPPORTING MEANS FOR DISK PLOW SHAFTS

Application filed October 22, 1931. Serial No. 570,434.

This invention relates to improvements in disk plows of that type wherein a plurality of disks are mounted on a single shaft, and more specifically, the invention relates to a thrust bearing providing a supporting means for one end of the shaft.

One of the objects of the invention is to eliminate the use of thrust bearings for such a shaft except at the rearward end thereof, thereby reducing the initial and replacement costs of the bearings by reducing friction and concentrating the same at the rear end of the shaft, and also lightening the draft load of the plow by such reduction of friction.

Other objects of the invention are to reduce end wear on the shaft to a minimum; to provide ready adjustability of the thrust bearing for taking up end wear on the shaft; and to provide for the automatic alignment of the shaft with respect to the thrust bearing.

Other objects and advantages of the invention will be apparent from the following description, considered in connection with the accompanying drawings, in which:

Figure 1 is a top plan, partly broken away, showing a plow shaft supported in accordance with this invention.

Figure 2 is an enlarged section taken on the line 2—2 of Figure 1.

Figure 3 is a sectional elevation taken at a point indicated by the line 3—3 of Figure 2.

Referring to the drawings in detail, the numeral 1 indicates a plow frame mounted on the usual ground wheels 2, and provided with a suitable draft bar 3. Carried by the frame 1 are a plurality of brackets 4 which support a thrust bearing 5 and a pair of guide bearings 6 for the disk supporting shaft 7. Although two guide bearings are illustrated in the present embodiment, this number may be increased or decreased in accordance with the length of the shaft 7 and the latter may be of any appropriate length in accordance with the number of disks 8 which it is desired to employ.

The thrust bearing 5 includes an outer part 9 and an inner part 10. The outer part 9 is formed with a hanger 11 secured to the rearmost bracket 4. The inner part 10 is of tapered formation and fits within a tapered bore 12 in the forward face of the outer part 9. The inner end of the bore 12 communicates with a chamber 13 having a larger diameter than the minimum diameter of the bore. The chamber 13 is located adjacent the rear end of the outer part 9, such end being closed with the exception of a relatively small opening 14 for receiving a lubricant nipple 15. The opening 14 communicates with a pocket 16 formed in the rear end wall of the chamber 13.

Formed with the inner part 10 is a flange 17 opposing the forward face of the outer part 9. The forward face of the part 9 is rounded as indicated at 18, and the flange 17 is formed with a groove 19 corresponding in contour to the rounded face 18 of the part 9. Interposed between the rounded face 18 and the groove 19 is a gasket 20 preferably formed of rubber or leather.

Extending lengthwise through the inner part 10 is an opening 21 through which the shaft 7 extends. The shaft 7 is provided with a head 22 projecting into the chamber 4 and bearing against the outermost of a plurality of washers 23 disposed within the chamber 13, the washers being of greater diameter than the diameter of the pocket 16. The washers 23 are of appropriate thickness to support the head 22 in such a manner that the part 10 will have a snug fit with the bore 12 without any binding of the part 10.

A suitable lubricant is inserted into the chamber 4 through the nipple 6 to prevent friction between the washers 23, and lubricant also is supplied to the peripheral face of the part 10 through a passage 24 through the hanger 11. The passage 24 is normally closed at its outer end by means of a plug 25. The gasket 20 prevents the escape of any of the lubricant at the forward face of the part 9 and further prevents the entrance of any dirt to the interior of such part. The washers 23 supporting the head 22 prevent any appreciable wear between the parts 9 and 10 and the lubricant flooding the washers 23 and head 22 prevent any appreciable wear within the chamber 13. The part 10 may be readily adjusted with respect to the bore 12 to insure a proper fit within the latter by increasing or decreasing the number of washers within the chamber 13.

Each of the guide bearings 6 is provided with a bore 26 of uniform diameter, through which a pair of flanged spool sections 28 slidably extend. One of the spool sections 28 bears against the adjacent disk 8 forwardly of the bearing 6 and the opposite spool section 28 bears against the adjacent disk 8 rearwardly of the bearing 6. The disks 8, other than those having the bearings 6 and spool sections 28 located therebetween, are maintained in spaced relation by means of flanged spools 29 abutting adjacent disks. The spools 29 and spool sections 28 are mounted on the shaft 7. The foremost disk 8 is maintained in abutment with the foremost spool 29 by means of a nut 30 threaded on the forward end of the shaft 7.

In the use of the plow having the disk carrying shaft supported in accordance with this invention, the thrust from all of the disks is imparted through the spools 29 and spool sections 28 to the bearing 5, thereby substantially eliminating wear on the guide bearings 6, and lightening the draft load of the plow by the concentration of all the friction within the bearing 5, and by the reduction of such friction to a minimum.

While the embodiment of the invention herein illustrated and described is to be considered as a preferred example of the same, it is to be understood that changes in the details of construction may be made, so long as such changes fall within the scope of the appended claims.

We claim:—

1. In a supporting means for a multiple plow disk carrying shaft, a thrust bearing including an outer part and a tapered inner part supporting the rearward end of the shaft, said outer part having a tapered bore and a chamber communicating with the bore, said inner part being rotatably seated in said bore and having an opening for the projection of the shaft therethrough into the chamber, a plurality of washers within the chamber for abutment with the rearward end of the shaft, means for admitting lubricant to said chamber, and a guide bearing slidably supporting the shaft forwardly of the thrust bearing.

2. In a supporting means for a plow disk carrying shaft, a thrust bearing including an outer part having a tapered bore opening through its forward face and further having a chamber communicating with the smaller end of said bore, a tapered inner part rotatably mounted within the bore and having an opening extending lengthwise therethrough, a flange formed on said inner part and opposing the forward face of the outer part, a gasket interposed between the flange and the forward face of said outer part, a shaft extending through said opening and projecting into said chamber, a plurality of washers within the chamber for supporting said shaft, and means for admitting lubricant to the chamber.

3. In a supporting means for a plow disk carrying shaft, a thrust bearing including an outer part having a tapered bore opening through its forward face and further having a chamber communicating with the smaller end of said bore, a tapered inner part rotatably mounted within the bore and having an opening extending lengthwise therethrough, a flange formed on said inner part and opposing the forward face of the outer part, a gasket interposed between the flange and the forward face of said outer part, a shaft extending through said opening and projecting into said chamber, a plurality of washers within the chamber for supporting said shaft, and means for admitting lubricant to the chamber, said chamber having a larger diameter than the minimum diameter of said bore.

4. In a supporting means for a plow disk carrying shaft, a thrust bearing including an outer part having a tapered bore opening through its forward face and further having a chamber communicating with the smaller end of said bore, a tapered inner part rotatably mounted within the bore and having an opening extending lengthwise therethrough, a flange formed on said inner part and opposing the forward face of the outer part, a gasket interposed between the flange and the forward face of said outer part, a shaft extending through said opening and projecting into said chamber, a plurality of washers within the chamber for supporting said shaft, and means for admitting lubricant to the chamber, said chamber having its outer end wall formed with a pocket having a smaller diameter than the diameter of said washers.

5. In a supporting means for a plow disk carrying shaft, a thrust bearing including an outer part having a tapered bore opening through the forward face thereof and further having a chamber communicating with the smaller end of said bore, said outer part having a rounded forward face, a tapered inner part rotatably mounted within the bore and having an opening extending lengthwise therethrough, a flange formed on said inner part and having a groove conforming in contour to the rounded forward face of said outer part and opposing such rounded face, a gasket curved in cross section interposed between said groove and rounded face, a shaft extending through said opening and having a portion thereof projecting into said chamber, a plurality of washers disposed in said chamber for supporting the projecting portion of said shaft, and means for admitting lubricant to said chamber.

6. In a supporting means for a plow disk carrying shaft, a thrust bearing including an outer part having a tapered bore opening through the forward face thereof and further having a chamber communicating with the smaller end of said bore, said outer part having a rounded forward face, a tapered inner part rotatably mounted within the bore and having an opening extending lengthwise therethrough, a flange formed on said inner part and having a groove conforming in contour to the rounded forward face of said outer part and opposing such rounded face, a gasket curved in cross section interposed between said groove and rounded face, a shaft extending through said opening and having a portion thereof projecting into said chamber, a plurality of washers disposed in said chamber for supporting the projecting portion of said shaft, means for admitting lubricant to said chamber, a hanger formed integrally with said outer part, and means for admitting lubricant through said hanger to said bore.

In testimony whereof we affix our signatures hereto.

JOSEPH B. MAPP.
FRED W. HOEME.